United States Patent [19]

Sauer

[11] Patent Number: 5,760,712
[45] Date of Patent: Jun. 2, 1998

[54] FUEL TIME INDICATOR

[75] Inventor: Douglass J. Sauer, Dayton, Ohio

[73] Assignee: American Circuit Technology, Inc., Springboro, Ohio

[21] Appl. No.: 706,527

[22] Filed: Sep. 4, 1996

[51] Int. Cl.[6] ................................. G08B 21/00
[52] U.S. Cl. ............... 340/945; 340/971; 340/686; 340/693; 340/450; 340/450.2; 340/309.15; 137/255; 137/555; 137/552.7; 364/442; 364/569; 244/1 R; 244/135 R
[58] Field of Search ................... 340/945, 971, 340/691, 693, 686, 678, 309.15, 450, 450.2, 309.4, 309.5; 137/255, 554, 555, 556.3, 556.6, 552.7, 625, 625.47; 364/442, 569; 244/1 R, 128, 135 R, 135 A, 135 C

[56] References Cited

U.S. PATENT DOCUMENTS

| | | | |
|---|---|---|---|
| 3,580,421 | 5/1971 | Bickford | 222/27 |
| 3,709,317 | 1/1973 | Ingham, Jr. | 180/271 |
| 3,825,027 | 7/1974 | Henderson | 137/265 |
| 3,958,107 | 5/1976 | Edelson et al. | 364/442 |
| 4,287,907 | 9/1981 | Worthy | 137/255 |
| 4,325,123 | 4/1982 | Graham et al. | 364/431.07 |
| 4,535,310 | 8/1985 | Schubring et al. | 335/61 |
| 4,536,843 | 8/1985 | Lambregts | 364/424.012 |
| 4,591,115 | 5/1986 | DeCarlo | 244/135 C |
| 4,827,417 | 5/1989 | Berger et al. | 364/433 |
| 4,888,986 | 12/1989 | Baer et al. | 73/188 |
| 4,939,654 | 7/1990 | Kouda et al. | 364/424.05 |
| 5,104,387 | 4/1992 | Pokorney et al. | 604/248 |
| 5,223,822 | 6/1993 | Stommes et al. | 340/686 |
| 5,371,359 | 12/1994 | Hagiuda et al. | 250/229 |
| 5,555,873 | 9/1996 | Nolen | 123/575 |

Primary Examiner—Jeffery Hofsass
Assistant Examiner—Benjamin C. Lee
Attorney, Agent, or Firm—Biebel & French

[57] ABSTRACT

A fuel time indicator which is removably mountable about a fuel tank selector switch for monitoring and displaying tank usage times for each of a plurality of fuel tanks is disclosed. The fuel time indicator comprises a portable frame including a switch position sensor for monitoring a plurality of positions of the fuel selector switch and generating a corresponding switch position signal. A timer generates a timing signal indicative of elapsed time. A controller responsive to the position signal and the timing signal generates tank usage times for each of the fuel tanks by selectively aggregating elapsed times. Visual indications of the tank usage times are provided by a display.

25 Claims, 12 Drawing Sheets

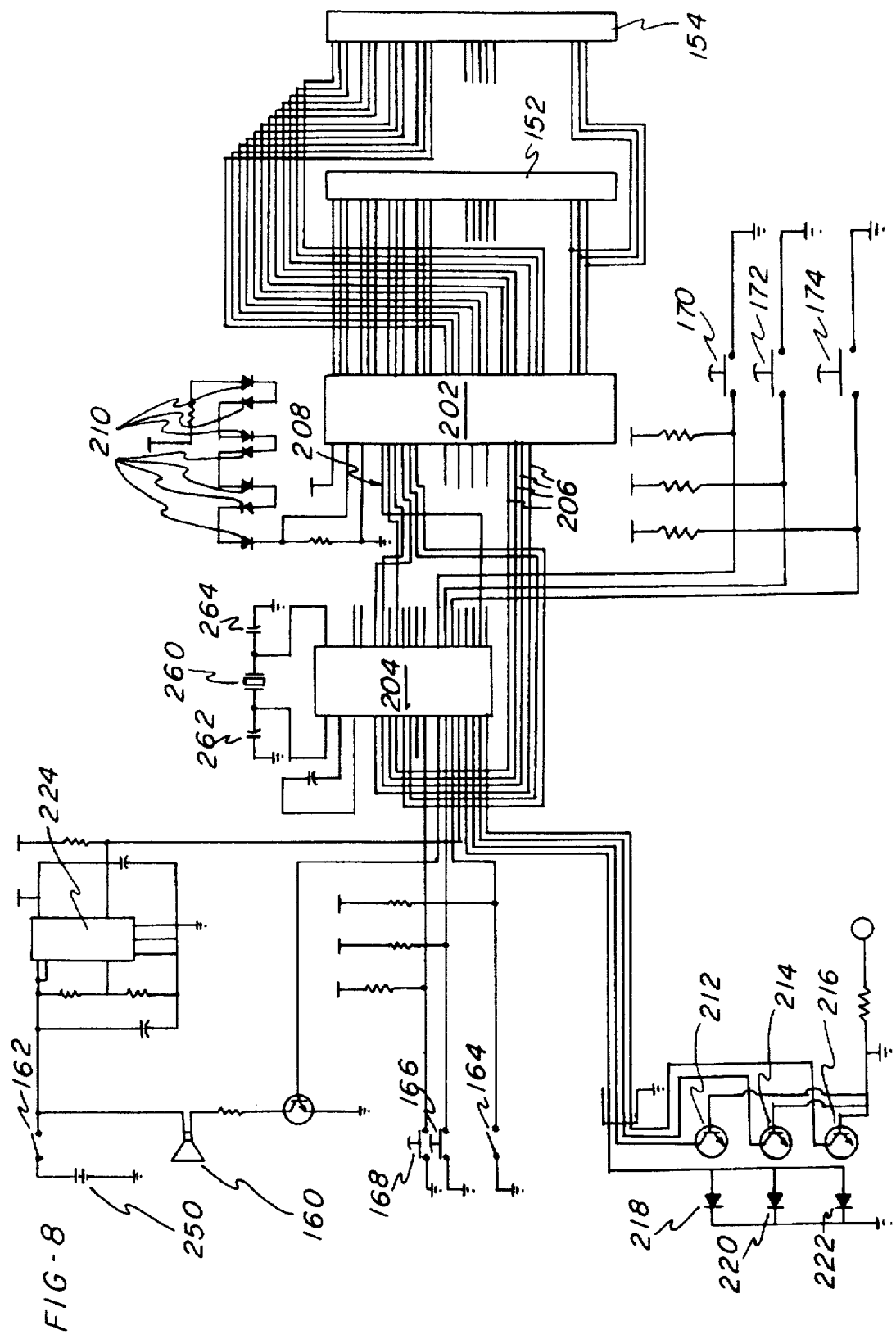

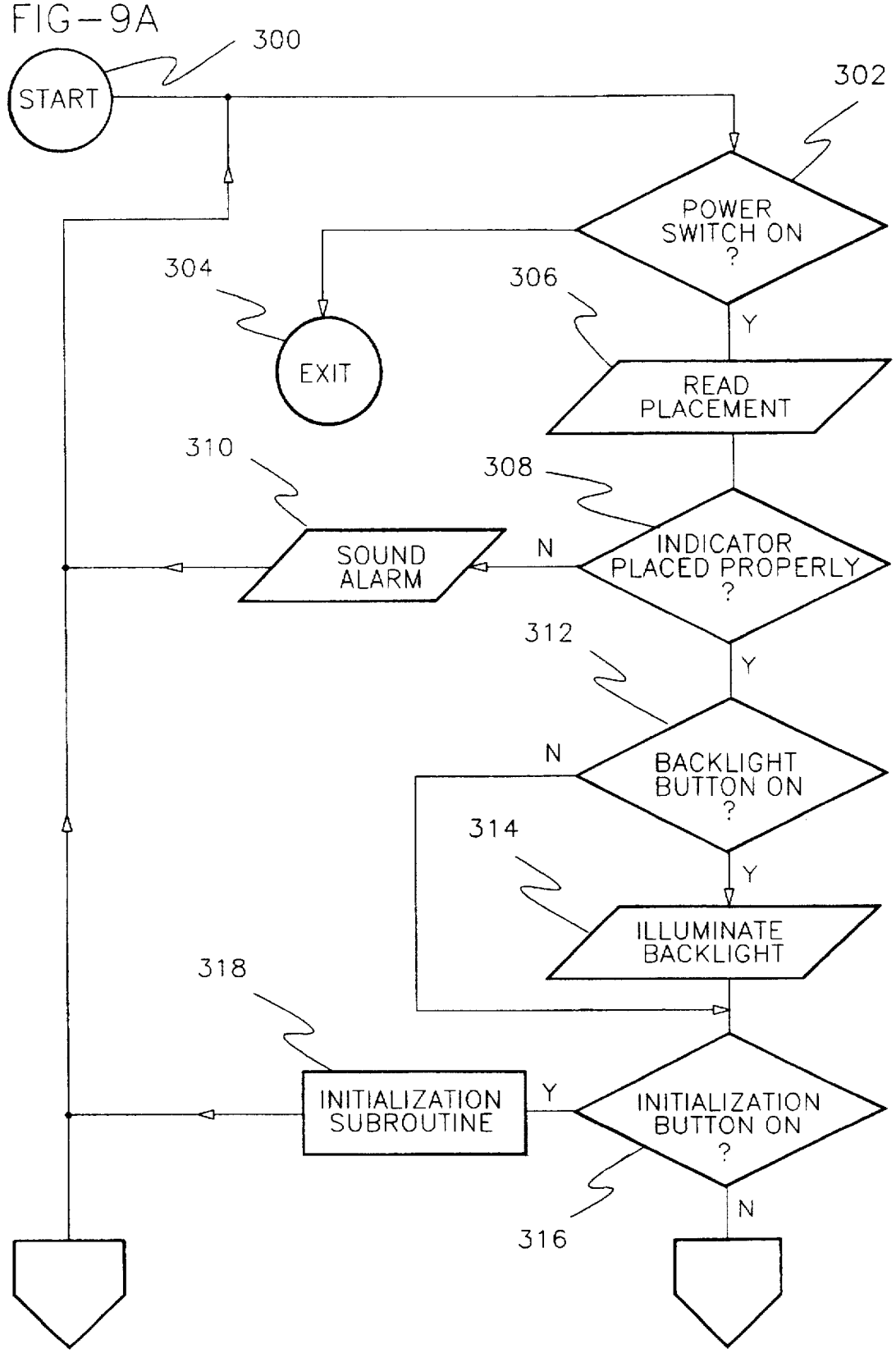

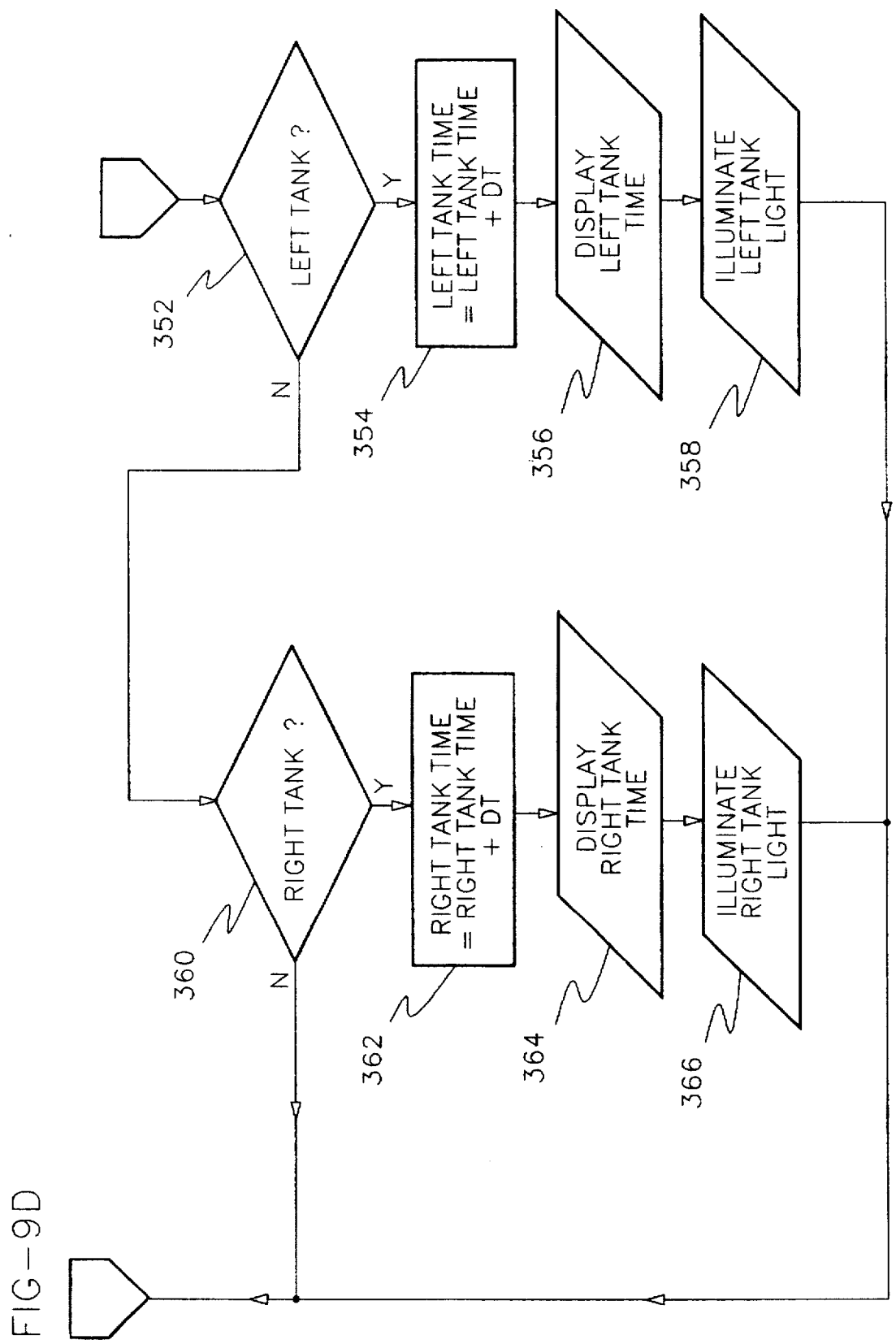

5,760,712

FUEL TIME INDICATOR

BACKGROUND OF THE INVENTION

1. Field of the Invention

The present invention relates to the field of aviation and more particularly to fuel tank management in small private planes. Such planes commonly are equipped with right and left fuel tanks which must be manually switched as the flight progresses. Customarily the pilot carries a clipboard and makes notes of the times when tank switches are made. Aircraft balance is maintained by regularly timed tank switching in reliance upon the handwritten notes.

2. Description of the Prior Art

Fuel supply systems in small aircraft typically comprise a plurality of fuel tanks and a manually operated tank selector switch. The selector switch is adapted for selecting an active fuel tank which supplies fuel to one or more engines. By altering the position of the tank selector switch, the pilot changes the tank supplying fuel to the engine(s). The fuel tanks are often located in the wings of the aircraft wherein the pilot must balance the fuel remaining in the tanks over each wing to ensure a proper weight distribution of the aircraft. The pilot must be constantly aware of the amount of fuel remaining in each tank and adjust the fuel selector switch at appropriate intervals to alternate tanks such that a proper weight distribution of fuel is maintained.

In many general aviation aircraft the fuel selector switch is placed in an obscure location and the fuel level indicators are small gauge style displays providing very inaccurate readings. Therefore, a commonly used and accepted method of fuel tank management in small aircraft is to record the amount of fuel in each tank at the time of every refueling. The period of time that may be flown on each tank is then calculated by the pilot as dependant upon engine power settings. Typically, the time of fuel supply used from each tank, known as "time-on-tank," is continually monitored by the pilot. The pilot uses a standard watch to record the times when the fuel selector switch is changed to select a different tank. The "time-on-tank" for each fuel tank is then hand-written on a piece of paper and updated each time a tank switch is made. The pilot relies on these notes for knowing when to make regularly timed tank switches in order to preserve proper aircraft balance.

This prior art method of fuel tank management is inherently unreliable and inaccurate. Any mistake in timing, failure to properly record a time, or confusion as to the fuel tank in use may result in an unbalanced weight distribution of the aircraft. Worse yet, fuel starvation and resulting loss of engine power are often caused by the pilot's failure to manually move the tank selector switch to a different tank when the fuel supply in the active tank is exhausted. In many instances of engine fuel starvation, it is discovered that ample fuel remained in the non-selected tank.

Several solutions to the problems of fuel tank management have been proposed by the prior art. Some proposals have required the use of complicated automatically controlled fuel tank selector valves which spontaneously respond to the fuel levels in each of a plurality of fuel tanks. Other proposals have included automatic valves responsive to differential pressures between the fuel tanks due to the fuel levels therein for automatically bypassing the manually operated selector valve. These prior art devices have several disadvantages including high manufacturing and installation costs resulting from their rather complex design and construction. These designs are typically incorporated as an integral part of either the fuel selector valve or the fuel tanks thereby requiring invasive installation into the aircraft's fuel system. Another potential problem presented by the prior art devices is uncertain reliability because of their complexity and the large number of components used therein.

Accordingly, there is a need for an apparatus and method for convenient, effective and reliable management of aircraft fuel tanks.

SUMMARY OF THE INVENTION

The present invention provides a portable, easily installed fuel time indicator for monitoring and displaying a time of fuel consumption for each of a plurality of alternately active fuel tanks. The fuel time indicator is placed unobtrusively adjacent a manually operable fuel tank selector switch which selects the currently active fuel tank.

The fuel time indicator of the present invention comprises a portable frame which is removably mountable adjacent the fuel tank selector switch. A switch position sensor is mounted on the portable frame for sensing a plurality of different positions of the fuel tank selector switch. The switch position sensor includes a position signal generator for generating a position signal having a plurality of states corresponding to the various fuel tank selector switch positions. A series of regularly timed clock pulses or time intervals are generated by a timer and then summed by a dedicated programmable controller in accordance with the states of the position signal to produce tank usage times. A display provides visual indications of the tank usage times for observation by the user. A dedicated power supply makes the fuel time indicator self-contained and ready for use.

The preferred embodiment of the fuel time indicator has a plurality of manual switches for resetting the tank usage times. The fuel time indicator may further include a plurality of tank indicator lights for indicating the state of the position signal. The dedicated programmable controller may determine dwell time of the current position signal state by counting clock pulses since the last change in state. When the dwell time exceeds a predetermined value, an alarm device may be activated thereby notifying the user to switch fuel supply tanks. A frame placement sensor may be mounted on the portable frame for sensing placement of the frame relative to the fuel tank selector switch and activating an alarm device when the portable frame is not properly placed for accurate selector switch monitoring.

Therefore, it is an object of the present invention to provide a fuel time indicator for providing a visual indication of the time of fuel supply from each of a plurality of aircraft fuel tanks.

It is another object of the invention to provide a non-invasive fuel time indicator for use with existing fuel systems.

It is a further object of the invention to provide a fuel time indicator which may be used readily on different aircraft.

It is yet another object of the invention to provide a non-invasive method of indicating a time of utilization of an aircraft fuel tank.

Other objects and advantages of the invention will be apparent from the following description, the accompanying drawings and the appended claims.

BRIEF DESCRIPTION OF THE DRAWINGS

FIG. 8 is a schematic illustration of the electrical circuitry of the fuel time indicator of the present invention; and FIGS. 9A–9D are flow charts illustrating the operation of a microcontroller employed in the present invention.

DETAILED DESCRIPTION OF THE PREFERRED EMBODIMENT

Figure 1:
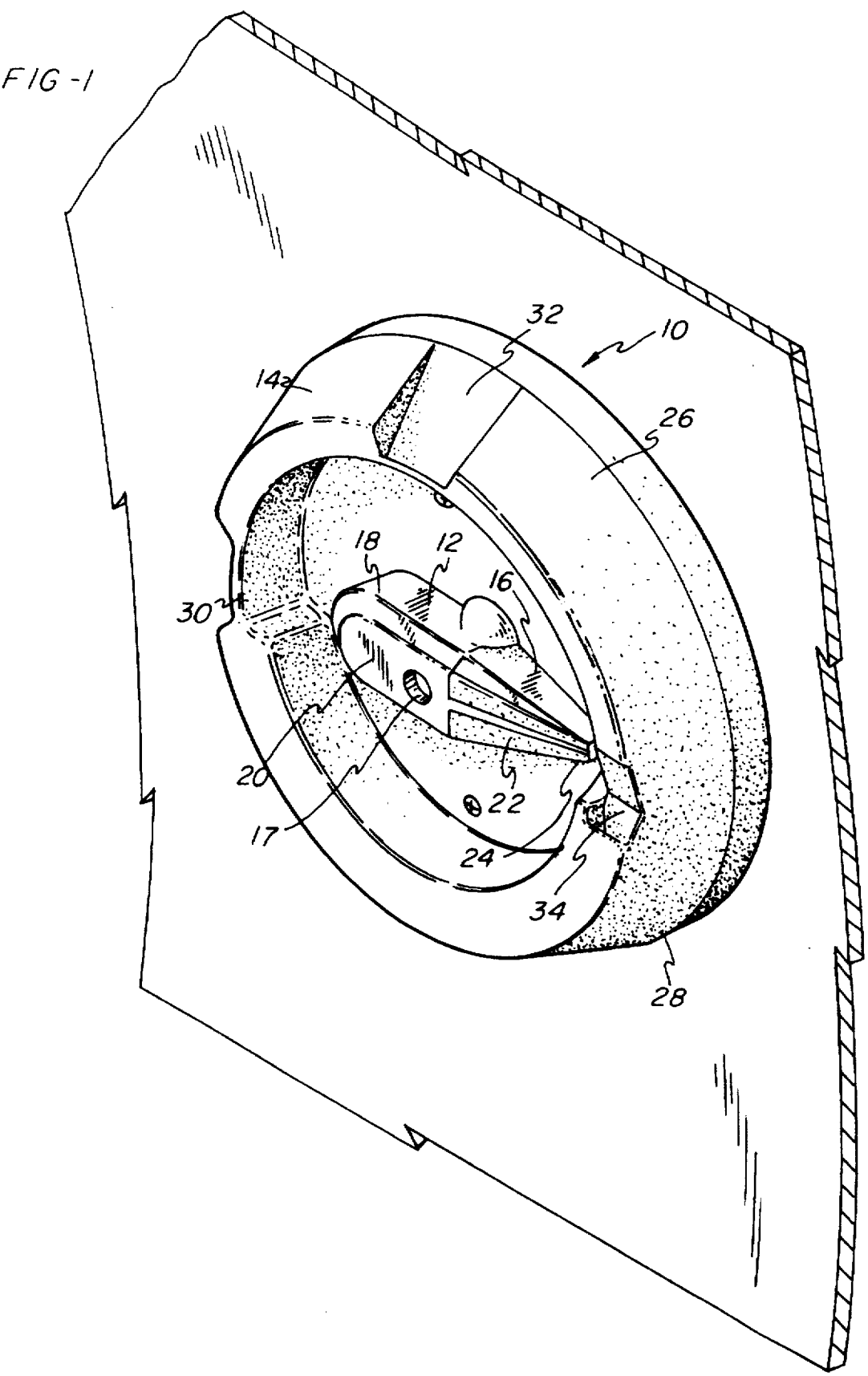
FIG. 1 is a front perspective view of a PA-28 aircraft fuel tank selector switch.

Referring initially to FIG. 1, a standard fuel tank selector 10 of a Piper series PA-28 aircraft includes a fuel tank selector switch 12 pivotly mounted to a molded housing 14 for supplying fuel alternatively to an engine (not shown) from left and right fuel tanks (not shown). While the following description details the present invention interacting with a PA-28 series fuel tank selector switch 12, it is to be understood that the invention is not limited as such and may be used with any fuel tank selector switch. The selector switch 12 includes a pointer portion 16 opposite a pivot point 17 from a tail portion 18. The tail portion 18 has a flat upper surface 20 while the pointer portion 16 has an inclined upper surface 22. Inclined upper surface 22 declines radially outwardly from a level flush with the flat upper surface 20 adjacent the pivot point 17 as it progresses towards a distal end 24 of the pointer portion 16.

A raised ring 26 having an outer surface 28 is molded in the housing 14 and includes a series of indentations 30, 32, 34 adapted for receiving placards indicating representations of various positions of the selector switch 12. In the PA-28 series fuel tank selector 10, indentation 30 represents an "OFF" position wherein no fuel flows to the engine. When the selector switch 12 is rotated 90 degrees clockwise from indentation 30 so that the pointer portion 16 is directed towards indentation 32, fuel is supplied to the engine from the left fuel tank. By rotating the selector switch 12 clockwise an additional 90 degrees, the pointer portion 16 is positioned so that distal end 24 is adjacent the indentation 34 which corresponds to a state when fuel is supplied to the engine from the right fuel tank.

Figure 2:
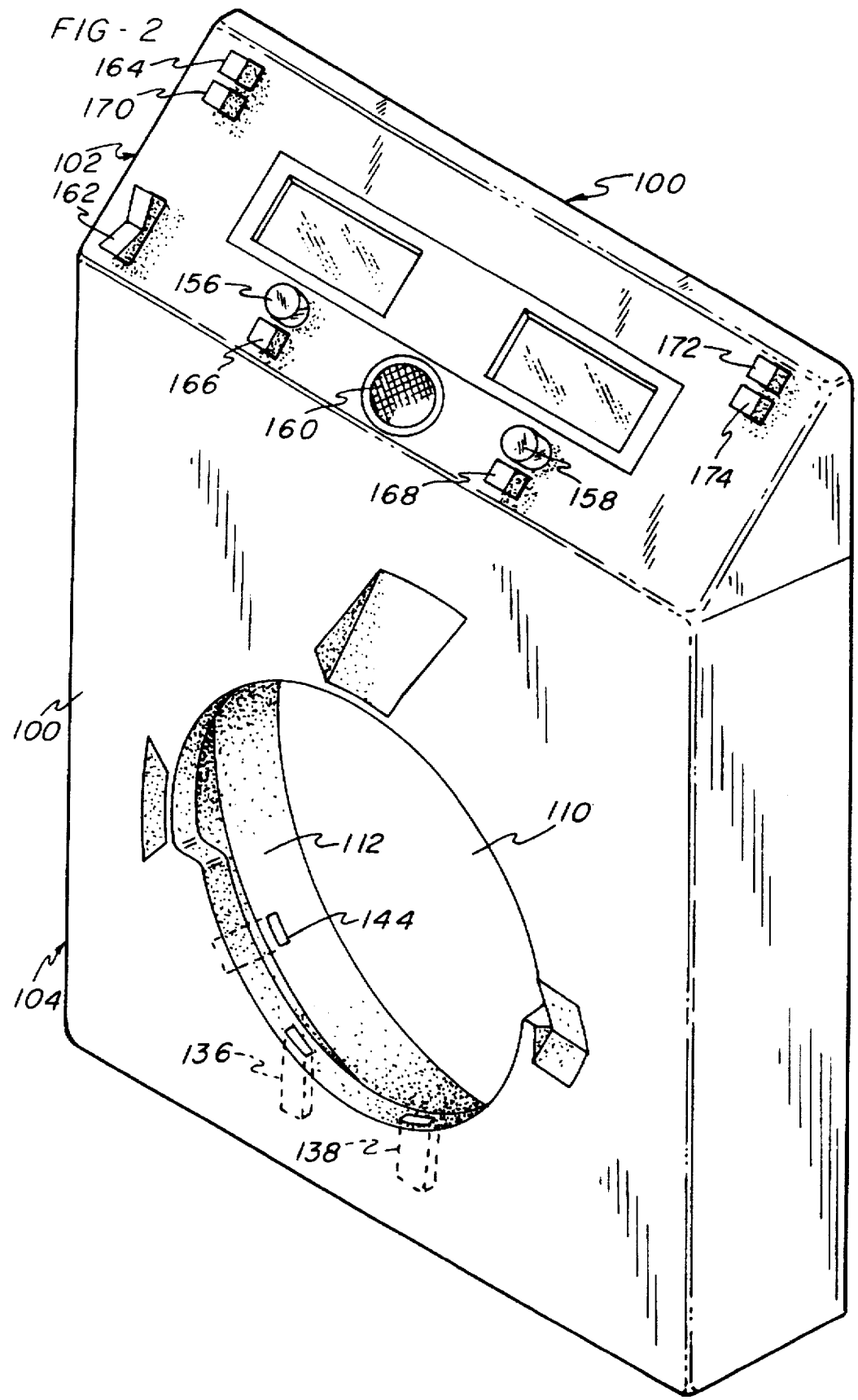
FIG. 2 is a front perspective view of the fuel time indicator of the present invention.
Figure 3:
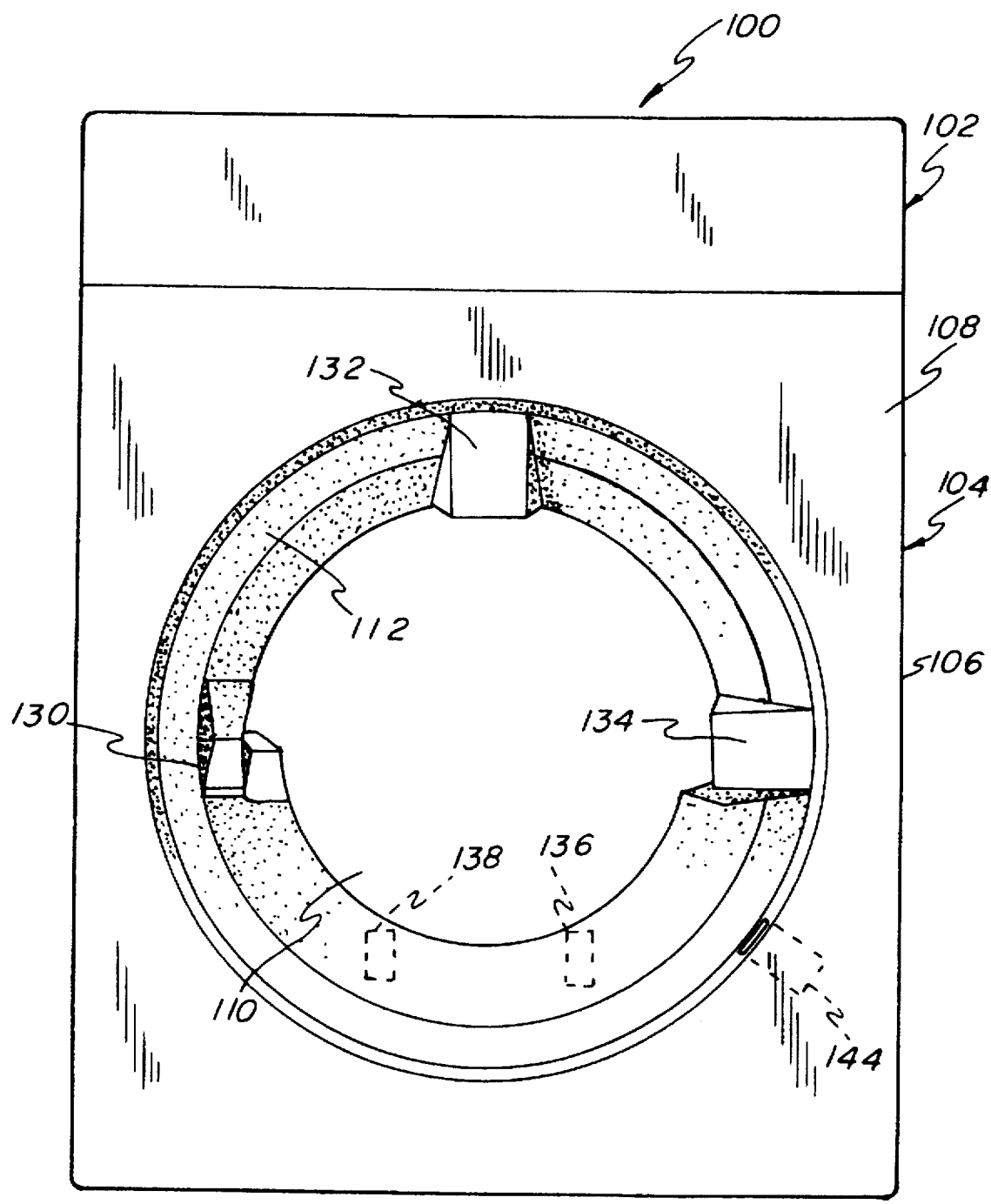
FIG. 3 is a rear elevation view of the fuel time indicator.

Now turning to FIGS. 2–3, the fuel time indicator 100 of the present invention comprises a main unit 102 in communication with a sensor unit 104. In the preferred embodiment, the main unit 102 will structurally attach to the sensor unit 104 via a tongue and groove structure as is well known in the art. Communication between the main unit 102 and sensor unit 104 is provided by a cable connected to a standard serial port. However, communication may be provided by other methods including, but not limited to, optical or acoustical links.

The sensor unit 104 comprises a portable frame 106 preferably injection molded from a thermoplastic material. A bottom surface 108 is molded to closely conform to the outer surface 28 and indentations 30, 32, 34 of the raised ring 26 wherein the portable frame 106 is removably mountable about the fuel tank selector 10. (FIG. 3). Surface deformations 130, 132, 134 are provided on the bottom surface 108 and conform to the indentations 30, 32, 34 of the raised ring 26. The deformations 130, 132, 134 assist in restraining rotational movement of the portable frame 106 when placed about the fuel tank selector 10 as illustrated in FIG. 4.

A ring contact surface 112 is molded on the bottom surface 108 and closely conforms to the shape of the raised ring 26 of the fuel tank selector 10. (FIGS. 2–3). The diameter of the ring contact surface 112 is slightly less than that of the raised ring 26 thereby facilitating a slight press fit wherein frictional force secures the sensor unit 104 to the fuel tank selector 10. Since a permanent bond is not established between the raised ring 26 and the portable frame 106, the fuel time indicator may be easily removed with minimal effort by the user. The portable frame 106 further comprises a switch aperture 110 for allowing the selector switch 12 to rotate freely when the sensor unit 104 is mounted adjacent the fuel tank selector 10. (FIG. 4).

Figure 4:
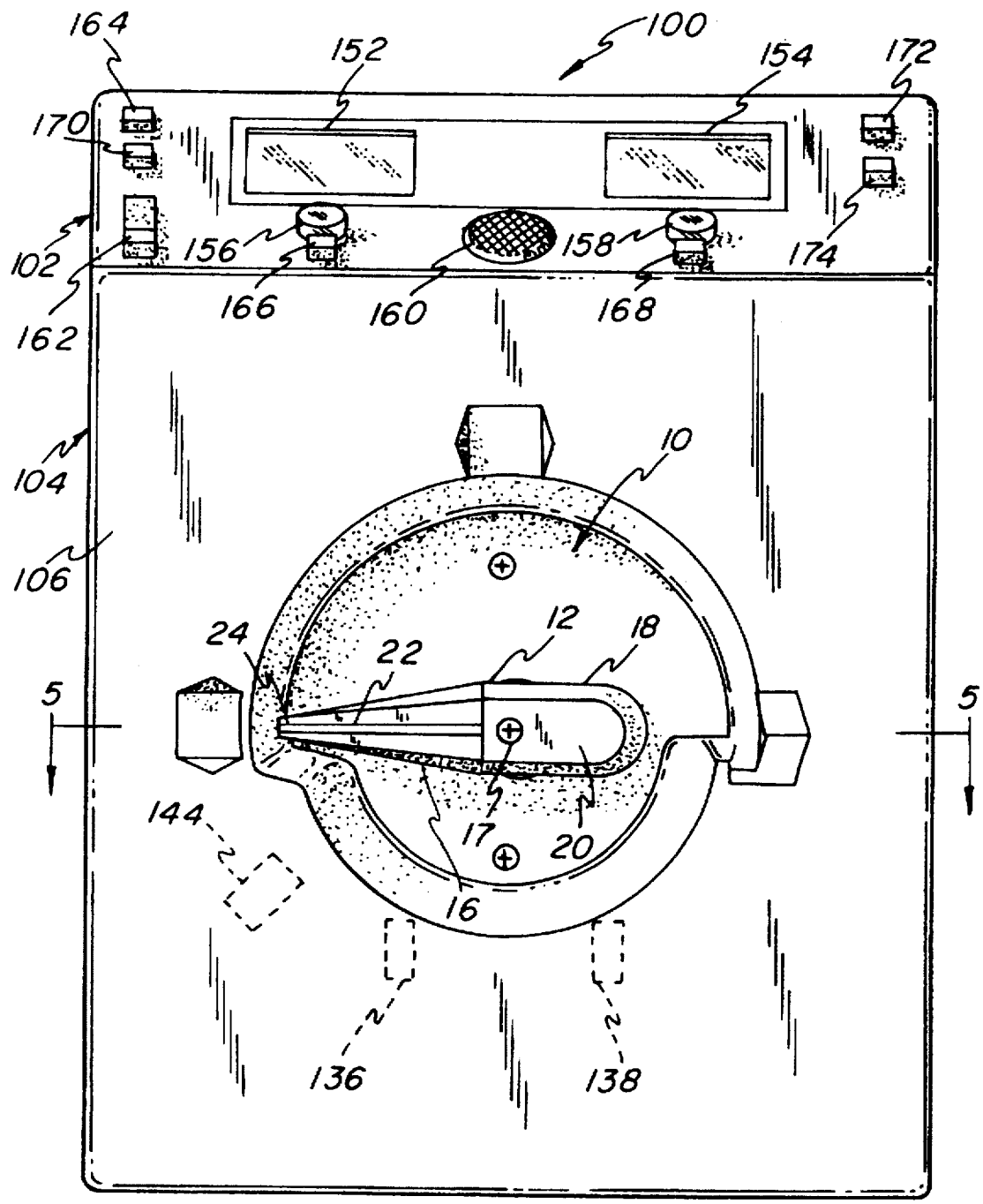
FIG. 4 is a front elevation view of the fuel time indicator adjacent the fuel tank selector switch of FIG. 1.

FIG. 4 illustrates the fuel time indicator 100 of the present invention mounted adjacent the fuel tank selector 10 of FIG. 1. The user simply presses the portable frame 106 into engagement with the raised ring 26 of the fuel tank selector 10. Frictional forces between the raised ring 26 and the ring contact surface 112 maintain the translational position of the fuel time indicator 100. Rotation of the fuel time indicator 100 is prevented by engagement between the surface deformations 130, 132, 134 and the indentations 30, 32, 34. Fuel time indicator 100 does not interfere with the operation of the selector switch 12 and may be readily removed by the user.

The sensor unit 104 further comprises a position sensor defined by a pair of photosensors 136, 138 for sensing light levels associated with the various positions of the selector switch 12. The position sensor generates position signals having states corresponding to the various positions of the selector switch 12.

Figure 5:
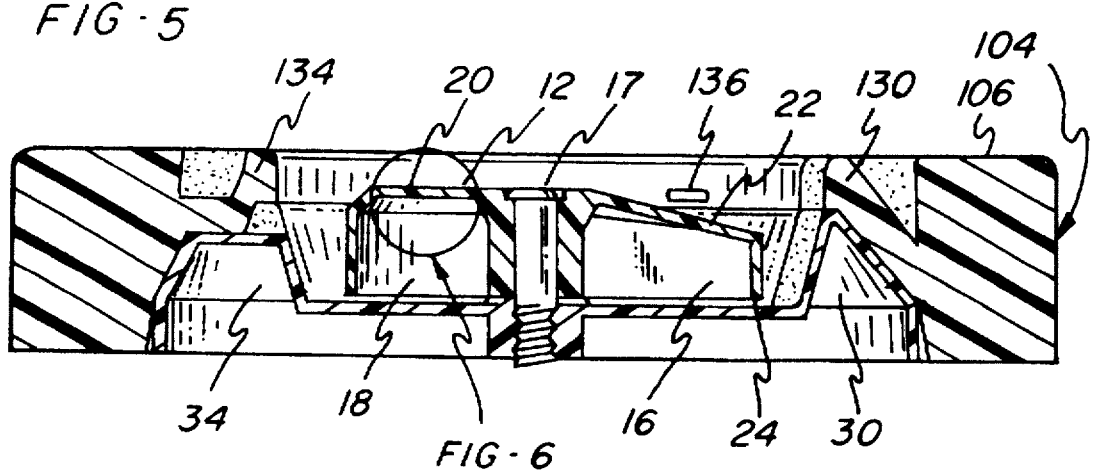
FIG. 5 is a cross-sectional view of the fuel time indicator taken along line 5—5 of FIG. 4 and in position adjacent the fuel tank selector switch of FIG. 1.
Figure 6:
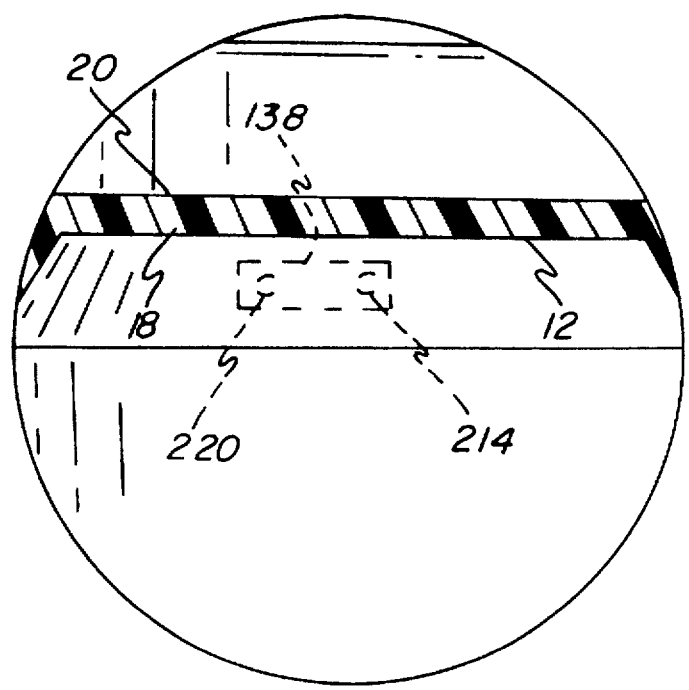
FIG. 6 is a partial detail view of FIG. 5.

Referring to FIGS. 5–7C, the photosensors 136, 138 are mounted to the portable frame 106 so that when the sensor unit 104 is properly placed about the fuel tank selector 10, light beams 140, 142 emitted by photosensors 136, 138 travel in a plane intermediate the flat upper surface 20 and the distal end 24 of the selector switch 12. Thus light beams 140, 142 are able to pass clear of inclined surface 22 but reflect off of the tail portion 18 of the selector switch 12. FIG. 6 is a detail view of the selector switch 12 with the fuel time indicator 100 positioned adjacent thereto as shown in FIG. 5. Photosensor 138 is mounted below the flat upper surface 20 wherein a light beam emitted by an LED 220 is reflected off the tail portion 18 and back towards a phototransistor 214.

Figure 7A:
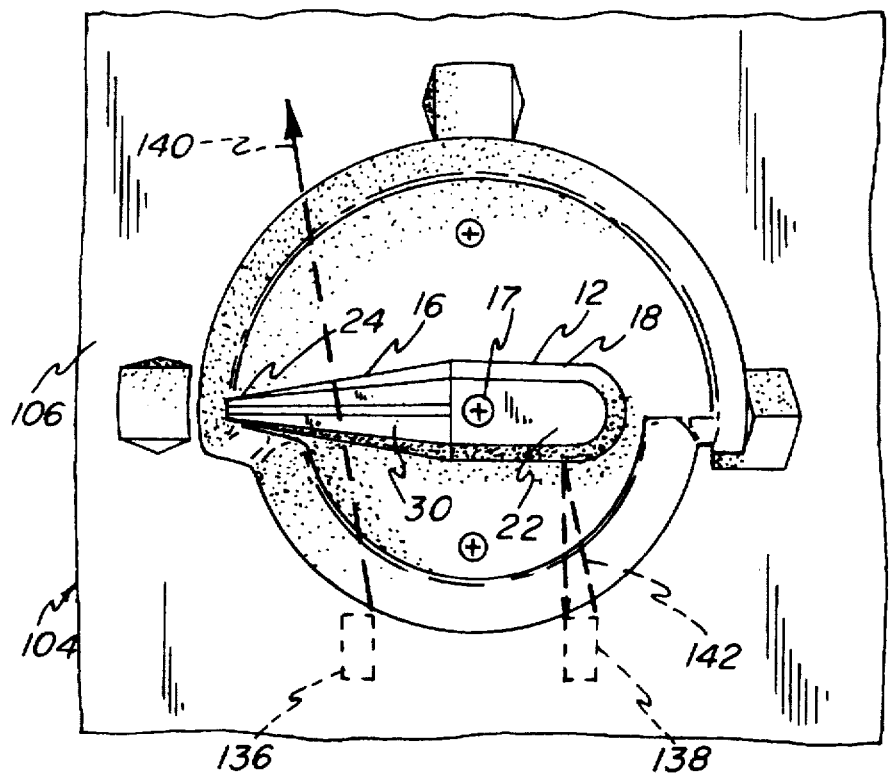
FIGS. 7A–7C are schematic illustrations of paths followed by light rays generated by photodiodes of the present invention.
Figure 7B:
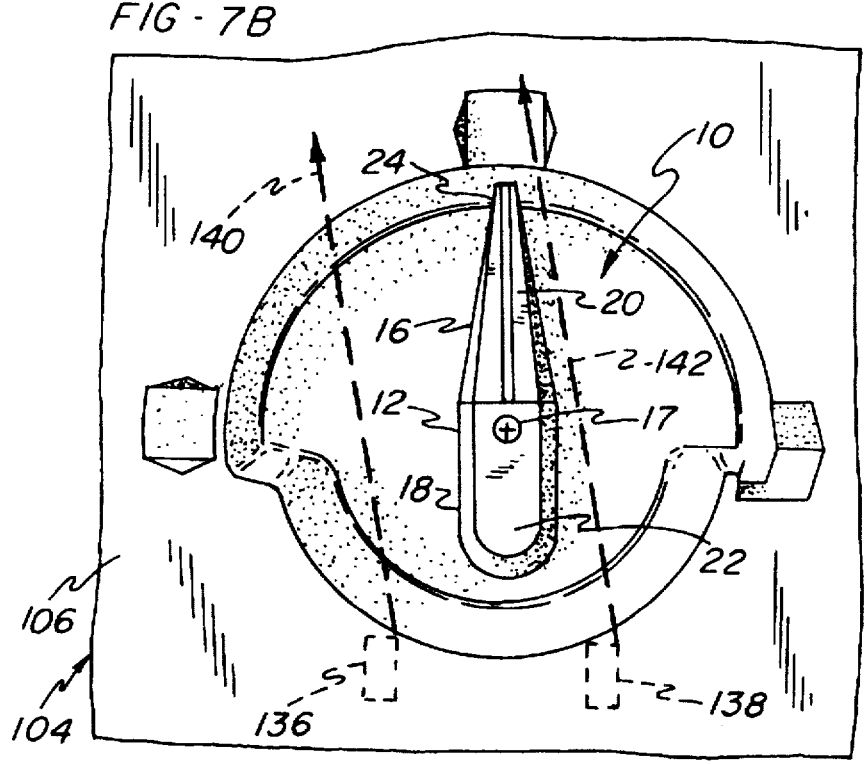
Figure 7C:
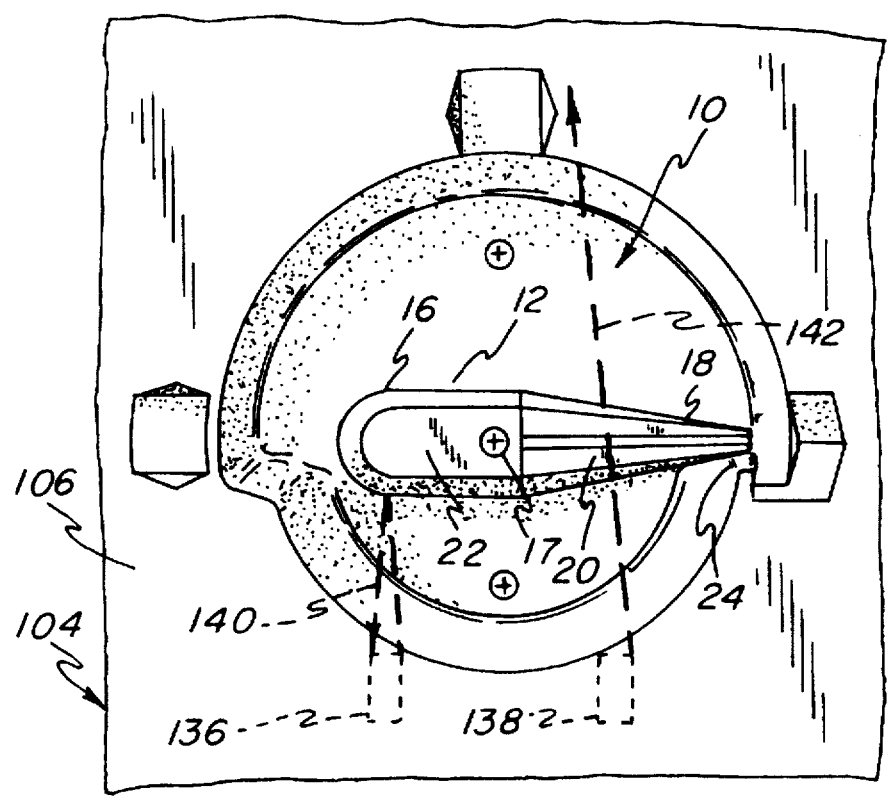

FIG. 7A illustrates the selector switch 12 in the "OFF" position wherein light beam 140 generated by photosensor 136 passes over the pointer portion 16 and light beam 142 from photosensor 138 is reflected off of tail portion 18. In the "LEFT" position, as illustrated in FIG. 7B, both light beams 140 and 142 are unobstructed and pass beyond the selector switch 12. As shown in FIG. 7C, when the selector switch 12 is in the "RIGHT" position, the light beam 140 generated by photosensor 136 reflects off of the tail portion 18 but the light beam 142 produced by photosensor 138 travels over the pointer portion 16 unimpeded.

A frame placement sensor defined by a frame placement photosensor 144 is mounted within the ring contact surface 112 of the portable frame 106. (FIG. 2). The frame placement photosensor 144 directs a beam of light toward the raised ring 26 surrounding the selector switch 12. If frame 106 is seated properly, then the light beam is reflected backwardly and is sensed by photosensor 144. The unit is gated off until photsensor 144 senses a reflected beam of light.

Returning to FIG. 2, the main unit 102 comprises left and right tank time displays 152, 154 defined by liquid crystal displays (LCDs) of the type well known in the art. The tank time displays 152, 154 provide a digital display of tank usage time, or aggregated time that each tank has supplied fuel to the engine. Left and right indicator lights 156, 158 are provided for selective illumination when the fuel selector switch 12 is in either the "LEFT" or "RIGHT" positions respectively.

An audio alarm device 160, preferably an audio transducer of the type well known in the art, may be provided in the main unit 102 for selective activation. The main unit 102 may include a variety of user activated switches including a power switch 162, a mode button 164, left and right tank reset buttons 166, 168, a backlight button 170, an initialization button 172, and a test button 174. The operation of these switches is discussed below with reference to FIGS. 7–8.

FIG. 8 illustrates the electronics for driving LCD arrays 152 and 154. As shown therein, the circuitry includes a driver 202 of conventional design operating under control of a microcontroller 204. LCD driving signals are generated in a BCD format and are supplied to driver 202 via four lines 206. LCD addresses are supplied by a series of address lines 208. Temperature compensation is provided by a series of diodes 210 connected to an input port of driver 202.

As further shown in FIG. 8, three phototransistors 212, 214, 216 are connected to an input port of microcontroller 204. Each phototransistor 212, 214, 216 has an associated LED 218, 220, 222. Associated pairs 212, 218 and 214, 220 collectively form the position photosensors 136, 138 of FIG. 4, while pair 216, 222 forms the frame placement photosensor 144 of FIG. 3. LED 218 generates light which is reflected backwardly toward phototransistor 212 only when fuel selector switch 12 is positioned for delivery of fuel from the right tank. This renders phototransistor 212 conductive, thereby producing a HI output therefrom. Similarly phototransistor 214 generates a HI output when selector switch 12 is in the OFF position. Both of the phototransistors 212, 214 produce a LO output when selector switch 12 is positioned for delivery of fuel from the left tank. Accordingly, microcontroller 204 is programmed to determine the position of the selector switch 12 by reading the phototransistor output position signals and applying the following Truth Table.

TABLE I

| Position | PT208 | PT210 |
|---|---|---|
| OFF | 0 | 1 |
| LEFT | 0 | 0 |
| RIGHT | 1 | 0 |

LED 222 generates light which is reflected backwardly toward phototransister 216 only when the portable frame 106 is properly placed about the fuel tank selector 10. Phototransister 216 is thereby rendered conductive and generates a HI output. When the portable frame 106, including the frame placement photosensitive cell 144, is not located about the fuel tank selector 10 then phototransistor 216 produces a LO output. This inhibits operation of LCD arrays 152, 154. If desired it may also activate the audio alarm device 160.

Microcontroller 204 operates under control of an internal clock operating at a frequency which is regulated by a crystal 260 and a pair of capacitors 262, 264. In a preferred embodiment the clock operates at a frequency of 4.9152 MHz. Microcontroller 204 keeps track of real time by counting clock pulses or time intervals. Usage times for the left and right tanks and dwell time for the present switch position are determined by a program as discussed below with reference to FIGS. 8A–8D. When a predetermined dwell time has been reached or exceeded the microcontroller 205 is programmed to activate the audio alarm device 160.

The electronic package is powered by a dedicated power supply comprising a 9 V. battery 250 and a voltage regulator 224. Preferably, all elements illustrated in FIG. 7 are mounted on a common circuit board secured to the main unit 102. Thus the fuel time indicator 100 is a self-contained, easily carried device.

Referring now to FIG. 9A, microntroller 204 enters its operating program at Ref. Numeral 300, a point corresponding to the operation of power switch 162. The program then initializes a series of variables, including the current time (NEW TIME), a previous time (OLD TIME), LEFT TANK TIME (initialized to zero), RIGHT TANK TIME (initialized to zero) and DWELL TIME (also initialized to zero). This is followed by a continuous looping process which is terminated at point 302 when the power switch 162 is operated. That causes an exit through point 304.

If the power switch 162 is in a position to supply power to the microcontroller 204, the program proceeds from point 302 to block 306 where the program reads the placement of the sensor unit 104. At block 308 the program interprets the placement information from block 306 and decides if the sensor unit 104 is properly placed adjacent the fuel tank selector 10. If the sensor unit 104 is improperly positioned then the program activates the audio alarm device 160. (block 310). Otherwise, the program continues to block 312 where it decides if the backlight button 170 has been operated. If so, then the LCDs 152, 154 are illuminated from behind in a conventional manner as indicated by block 314. If the backlight button 170 has not been operated then the program continues to block 316.

Figure 9B:
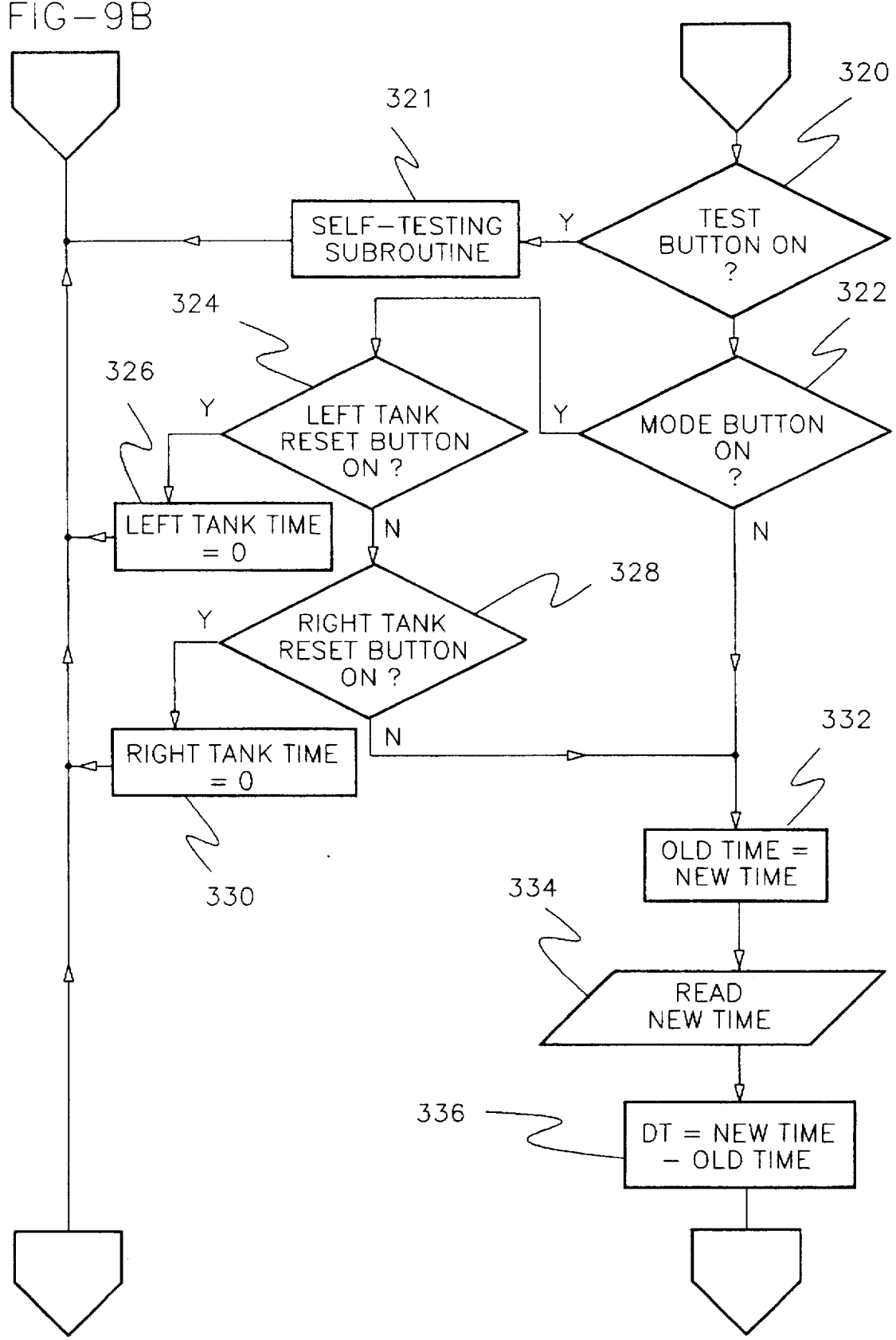

At block 316 the program decides if the initialization button 172 has been operated. If the answer is "YES" then the program proceeds with an initialization subroutine (block 318) to verify the proper operation of the various electrical components of the fuel time indicator 100 and reinitialize the variables. Referring to FIG. 9B, if the initialization button 172 has not been operated then the program continues to block 320 and decides if the test button 174 has been activated. When operated, the program continues with a self-testing subroutine (block 321) similiar to the initialization subroutine (block 318) but without reinitialization of the variables so that the test button 174 may be used during operation of the fuel time indicator 100. If the test button 174 has not been operated then the program continues to decision block 322.

Block 322 represents the decision made by the program regarding the operation of the mode button 164 which must be simultaneously activated with either the left tank reset button 166 or the right tank reset button 168 to reset the LEFT TANK TIME or RIGHT TANK TIME, respectively. If the mode button 164 is activated, the program will first ask if the left tank reset button is also active (block 324). If "YES" then the LEFT TANK TIME is reset to zero (block 326), otherwise the program continues to decision block 328. The program asks if the right tank reset button 168 is active (block 328) and if it is, the program resets the RIGHT TANK TIME to zero. If the right tank reset button 168 is not active then the program continues to block 332.

So long as the program continues, it computes and displays the aggregated time on each tank. The program reads NEW TIME (block 334) each time through the loop and saves the value thereof until the next reading. The value of OLD TIME is also saved. At block 332, just prior to block 334, the value of OLD TIME is set equal to NEW TIME. Therefore the difference between NEW TIME and OLD TIME is precisely equal to the transit time around the loop. That difference, DT, is calculated at block 336.

Figure 9C:
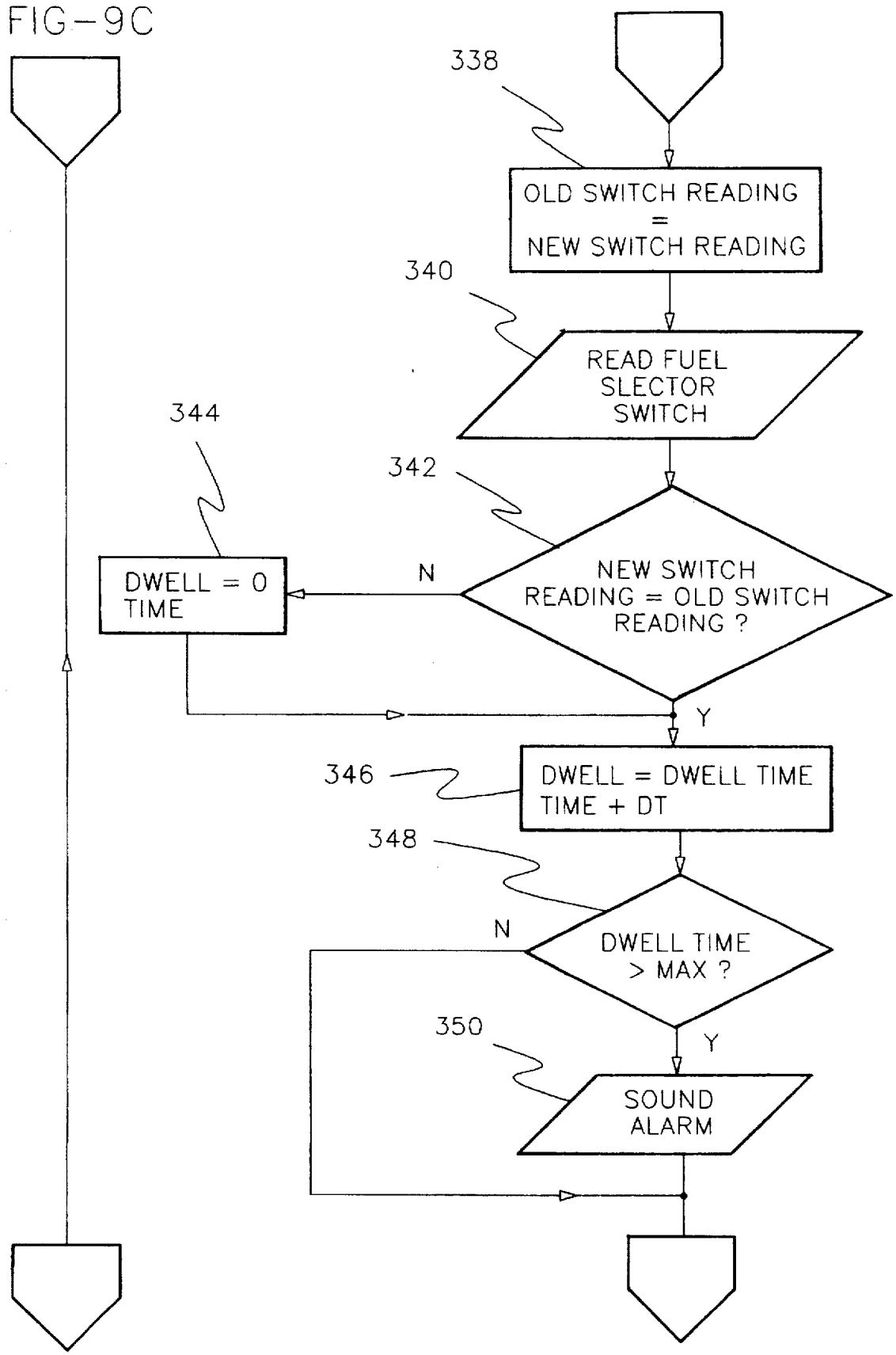

Continuing with FIG. 9C, the program reads the position of the fuel selector switch 12 (block 340) and proceeds to decision block 342. Prior to reading the position of the fuel selector switch 12, the program resets the position reading from the prior loop, NEW SWITCH READING, to equal OLD SWITCH READING (block 338). At block 342, if the selector switch 12 has changed position since the last loop then NEW SWITCH READING will not equal OLD SWITCH READING and the program will reset the DWELL TIME variable to zero (block 344). Otherwise, the program adds the value of DT to DWELL TIME (block 346) whereby the time the fuel selector switch 12 is continuously in any one position is updated. When DWELL TIME exceeds a predetermined maximum time, MAX, (block 348) the program sounds the audio alarm device 160 (block 350).

The program continues with a branching routine including branch points 352 and 360 as illustrated in FIG. 9D. If selector switch 12 is in the LEFT tank position, then the value of DT is added to the LEFT TANK TIME (block 354), and the left tank time display 152 is updated. The left tank light 156 will also be illuminated (block 358). However, if the selector switch 12 is found to be in the right tank position, then the value of DT is added to the RIGHT TANK TIME (block 362), right tank time display 154 is updated (block 364), and the right tank light 158 is illuminated (block 366).

It will be appreciated that it is unnecessary to observe the position of fuel tank selector switch 12 on a continuous basis. It is sufficient to know an initial switch position or state and to obtain an indication of changes of state which occur thereafter. Fuel tank usage times are readily determined by counting clock pulses or otherwise measuring elapsed time between changes of state. Thus photosensors 136 and 138 could be replaced by a variety of different types of sensors including those activated by motion, magnetic fields or electrical conductivity.

It should be apparent from the above description that the present invention provides for a portable, self-contained fuel time indicator 100 for monitoring and displaying the time of fuel supply from a plurality of fuel tanks. In addition, it should be apparent that the fuel time indicator 100 may be easily installed, removed and transported by the user.

While the form of apparatus herein described and the method of operation thereof constitute preferred embodiments of the invention, it is to be understood that the invention is not limited to this precise form of apparatus and method, and that changes may be made in either without departing from the scope of the invention which is defined in the appended claims.

What is claimed is:

1. A method of indicating utilization time for a fuel tank comprising the steps of:

positioning a photosensor adjacent a manually actuatable selector switch having a first position which enables withdrawal of fuel from said tank and a second position which prevents withdrawal of fuel therefrom;

causing said photosensor to generate a position signal which undergoes a first change of state when said selector switch is moved from said second position to said first position and which undergoes a second change of state when said selector switch is moved from said first position to said second position;

measuring an elapsed time between an occurrence of said first change of state and an occurrence of said second change of state;

storing said elapsed time;

repeating aforesaid steps;

determining a time of utilization by summing values of elapsed time which have been generated and stored as aforesaid; and generating a visual display of said time of utilization.

2. A fuel time indicator for monitoring and displaying tank usage times for each of a plurality of fuel tanks connected for supplying fuel alternatively under switching control of a fuel tank selector switch, said fuel time indicator comprising:

a portable frame removably mountable about said fuel tank selector switch;

a frame placement photosensitive cell mounted on said portable frame for sensing light levels associated with placement of said portable frame relative to said tank selector switch and producing a placement signal indicative thereof;

a plurality of switch position photosensitive cells for sensing light levels along predetermined paths which are selectively blocked by positioning said switch in one of a plurality of positions and producing a corresponding switch position signal;

a timer for generating a timing signal indicating the passage of time intervals of predetermined duration;

a controller responsive to said placement signal, to said switch position signal and to said timing signal for generating a dwell time by aggregating a series of consecutive ones of said time intervals during which said switch continuously occupies one of said positions, said controller further comprising means for generating a tank usage time for each of said switch positions by aggregating ones of said time intervals during which said switch occupies said position;

an audio alarm device for selective activation by said controller for providing an audio alarm signal in response to said placement signal and said dwell time;

a plurality of digital display devices for displaying visual images of said tank usage times;

a switch for resetting said tank usage times;

a plurality of tank indicator lights for selective activation by said controller in response to said switch position signal; and a dedicated power supply for powering said photosensitive cells, said timer, said controller, said audio alarm device, said digital display devices and said tank indicator lights.

3. A fuel time indicator for monitoring and displaying tank usage times for each of a plurality of fuel tanks connected for supplying fuel alternatively under switching control of a fuel tank selector switch, said fuel time indicator comprising:

a portable frame removably mountable about said fuel tank selector switch;

a switch position sensor mounted on said portable frame for monitoring a plurality of positions of said fuel tank selector switch and producing a switch position signal indicative thereof;

a timer for generating a timing signal indicative of elapsed time;

a controller responsive to said switch position signal and to said timing signal for generating tank usage times for each of said fuel tanks by selectively aggregating elapsed times indicated by said timing signal; and a display for displaying visual images of said tank usage times.

4. The fuel time indicator of claim 1 further comprising a dedicated power supply for powering said switch position sensor, said timer, said controller and said display.

5. The fuel time indicator of claim 1 further comprising a switch for resetting said tank usage times.

6. The fuel time indicator of claim 1 wherein said switch position sensor comprises a photosensitive cell for sensing light levels associated with said positions of said fuel tank selector switch and producing a switch position signal indicative thereof.

7. The fuel time indicator of claim 1 wherein said display comprises a plurality of digital display devices for displaying visual images of said tank usage times.

8. The fuel time indicator of claim 1 further comprising a plurality of tank indicator lights for selective activation by said controller in response to said switch position signal.

9. The fuel time indicator of claim 1 further comprising an alarm device responsive to said controller.

10. The fuel time indicator of claim 9 wherein said alarm device comprises an audio alarm device for selectively providing an audible alarm signal.

11. The fuel time indicator of claim 9 further comprising means for activating said alarm device when said portable frame is not properly placed about said fuel tank selector switch.

12. The fuel time indicator of claim 11 further comprising a frame placement sensor mounted on said portable frame for monitoring placement of said portable frame relative to said tank selector switch and producing a placement signal indicative thereof.

13. The fuel time indicator of claim 9 further comprising means for activating said alarm device when said fuel tank selector switch has remained in one of said positions continuously for greater than a predetermined time.

14. The fuel time indicator of claim 13 wherein said controller further comprises means for determining continuous time said fuel tank selector switch has remained in one of said positions by selectively aggregating elapsed time indicated by said timing signal.

15. A self-contained aircraft fuel time indicator comprising:

a portable frame configured for resting unobtrusively adjacent an aircraft fuel tank selector switch;

a switch position sensor mounted on said frame for sensing a plurality of different positions of a fuel tank selector switch situated adjacent said frame, said switch position sensor comprising a position signal generator for generating a position signal having a plurality of states corresponding to said positions;

a dedicated timer for generating a series of regularly timed clock pulses;

a dedicated controller for determining tank usage times by summing said clock pulses in accordance with values of said states;

a display for providing visual indications of said tank usage times; and a dedicated power supply for powering said switch position sensor, said timer, said controller and said display.

16. The fuel time indicator of claim 15 further comprising a switch for resetting said tank usage times.

17. The fuel time indicator of claim 15 further comprising a plurality of tank indicator lights for selective activation in response to said values of said states corresponding to said positions.

18. The fuel time indicator of claim 15, wherein said switch position sensor comprises a plurality of photosensitive cells for sensing light levels associated with said positions and causing corresponding state variations in said position signal.

19. The fuel time indicator of claim 15 further comprising an alarm device responsive to said controller.

20. The fuel time indicator of claim 19 wherein said alarm device comprises an audio alarm device for selectively providing an audible alarm signal.

21. The fuel time indicator of claim 15 further comprising means for activating said alarm device when said fuel tank selector switch has remained in one of said positions continuously for greater than a predetermined time.

22. The fuel time indicator of claim 21 wherein said controller further comprises means for generating a dwell time by aggregating a series of ones of said clock pulses during which said switch continuously occupies one of said positions.

23. The fuel time indicator of claim 15 further comprising means for activating said alarm when said portable frame is not properly placed about said fuel tank selector switch.

24. The fuel time indicator of claim 23 further comprising a frame placement sensor mounted on said frame for sensing placement of said frame relative to said tank selector switch and for generating a frame placement signal corresponding to said frame placement.

25. The fuel time indicator of claim 24, wherein said frame placement sensor comprises a photosensitive cell for sensing light levels associated with said placement of said portable frame relative to said tank selector switch and causing corresponding state variations in said frame placement signal.

* * * * *